Nov. 1, 1927.

V. G. VAUGHAN ET AL 1,647,323

ELECTRIC PERCOLATOR

Filed Dec. 17, 1925

WITNESSES:

INVENTORS
Victor G. Vaughan &
Clyde C. Harpster.
BY

ATTORNEY

Nov. 1, 1927.

V. G. VAUGHAN ET AL 1,647,323

ELECTRIC PERCOLATOR

Filed Dec. 17, 1925   3 Sheets-Sheet 2

WITNESSES:

INVENTORS
Victor G. Vaughan &
Clyde C. Harpster.
BY
ATTORNEY

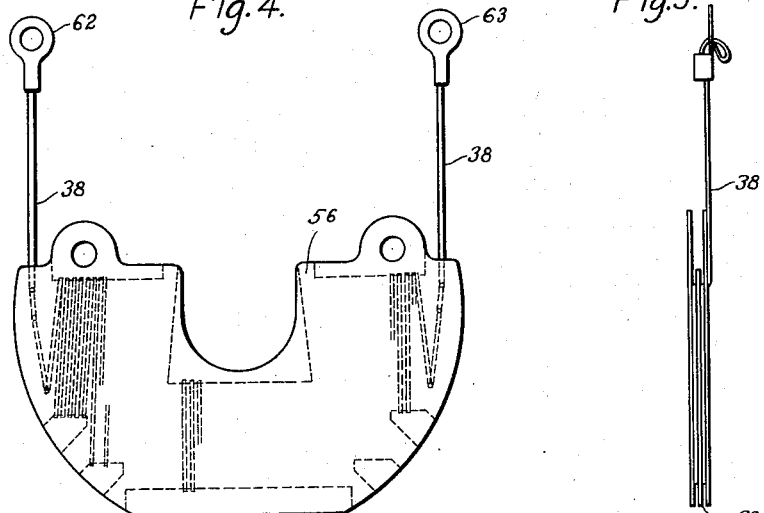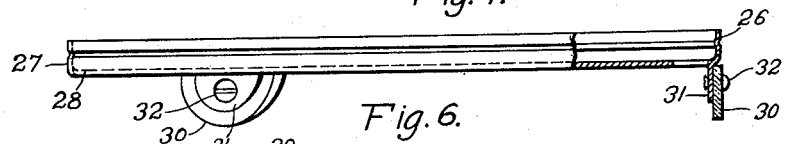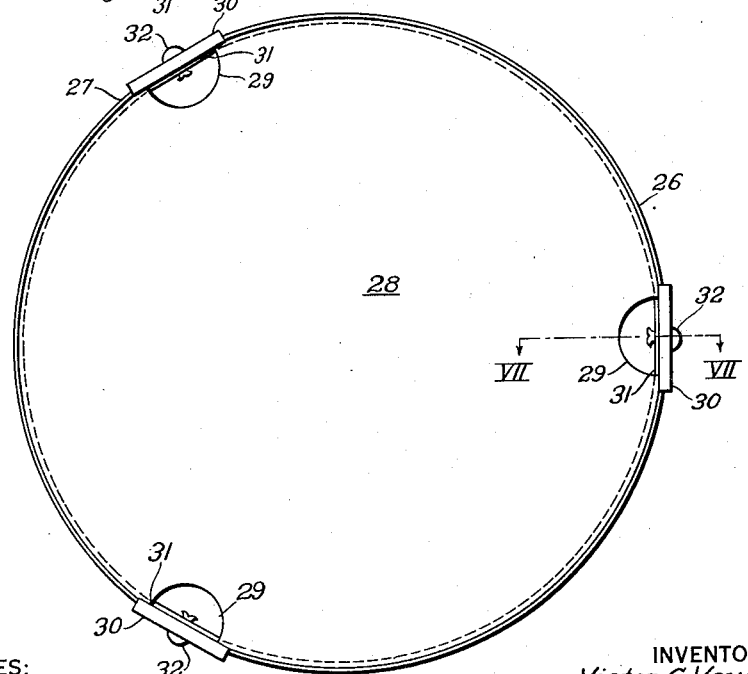

Patented Nov. 1, 1927.

1,647,323

UNITED STATES PATENT OFFICE.

VICTOR G. VAUGHAN, OF EAST PITTSBURGH, PENNSYLVANIA, AND CLYDE C. HARPSTER, OF MANSFIELD, OHIO, ASSIGNORS TO WESTINGHOUSE ELECTRIC AND MANUFACTURING COMPANY, A CORPORATION OF PENNSYLVANIA.

ELECTRIC PERCOLATOR.

Application filed December 17, 1925. Serial No. 76,000.

Our invention relates to electrically heated devices and particularly to thermally controlled electric percolators.

An object of our invention is to provide a heating unit for an electric percolator that shall be easily manufactured, having a minimum number of co-operating members, and which may be easily assembled.

Another object of our invention is to provide a heating unit for an electric percolator that shall have low thermal capacity and high thermal conductivity, whereby the time required for the first percolating action to take place will be reduced to a reasonable minimum.

Another object of our invention is to provide a heating unit, having a thermal responsive device attached thereto, for an electric percolator, whereby said thermal device will be operative to de-energize said heating unit in a period of time that varies inversely in accordance with the rate of flow of the heat energy generated therein.

Another object of our invention is to provide a supporting base, of cup-shape, for an electric percolator, wherein a heating unit for producing percolating action is located, and which shall have a single cover member resiliently engaged therewith, that serves to enclose the heating unit, having leg members thereon for supporting the device.

In practicing our invention, we provide an electric percolator comprising a fluid container, having an outlet spout attached thereto, and a base portion of inverted cup-shape, attached to the fluid container for supporting the same.

We also provide an electric heating unit for heating fluid in said container by periodic percolating actions. The heating unit comprises a member having a vaporizing chamber therein, a resistor element clamped thereto, and a thermal responsive device operative to de-energize the resistor element in a period of time that varies inversely in accordance with the rate at which heat energy is transferred to the liquid in the vaporizing chamber.

A portion of the heating unit extends into the fluid container through a hole that is common to the bottom thereof and to the supporting base, and the remainder depends into the space enclosed by the base portion.

The bottom of the cup-shape supporting base is riveted to the bottom of the fluid container. Terminals for the resistor member are attached to the base and are insulated therefrom. The rim of the supporting base is provided with integral lugs, which serve to register with a cover member on which the legs for the supporting base are attached. The rim of the cover member is bent over at an angle of substantially 90° and has a groove therein that registers with the aforesaid lugs.

At the periphery of the cover member, a plurality of portions are pressed out and bent downwardly from the rim thereof to which leg members are attached.

In the accompanying drawings,

Fig. 4 is a plan view of the resistor element employed in the device illustrated in Figs. 1, 2 and 3.

Fig. 5 is a side view of the device illustrated in Fig. 4,

Fig. 6 is a bottom plan view of the cover member illustrated in Figs. 1, 2, 3 and 7; and Fig. 7 is a view in partial section taken on the line VII—VII of Fig. 6 of the cover member for the supporting base.

Figure 1:
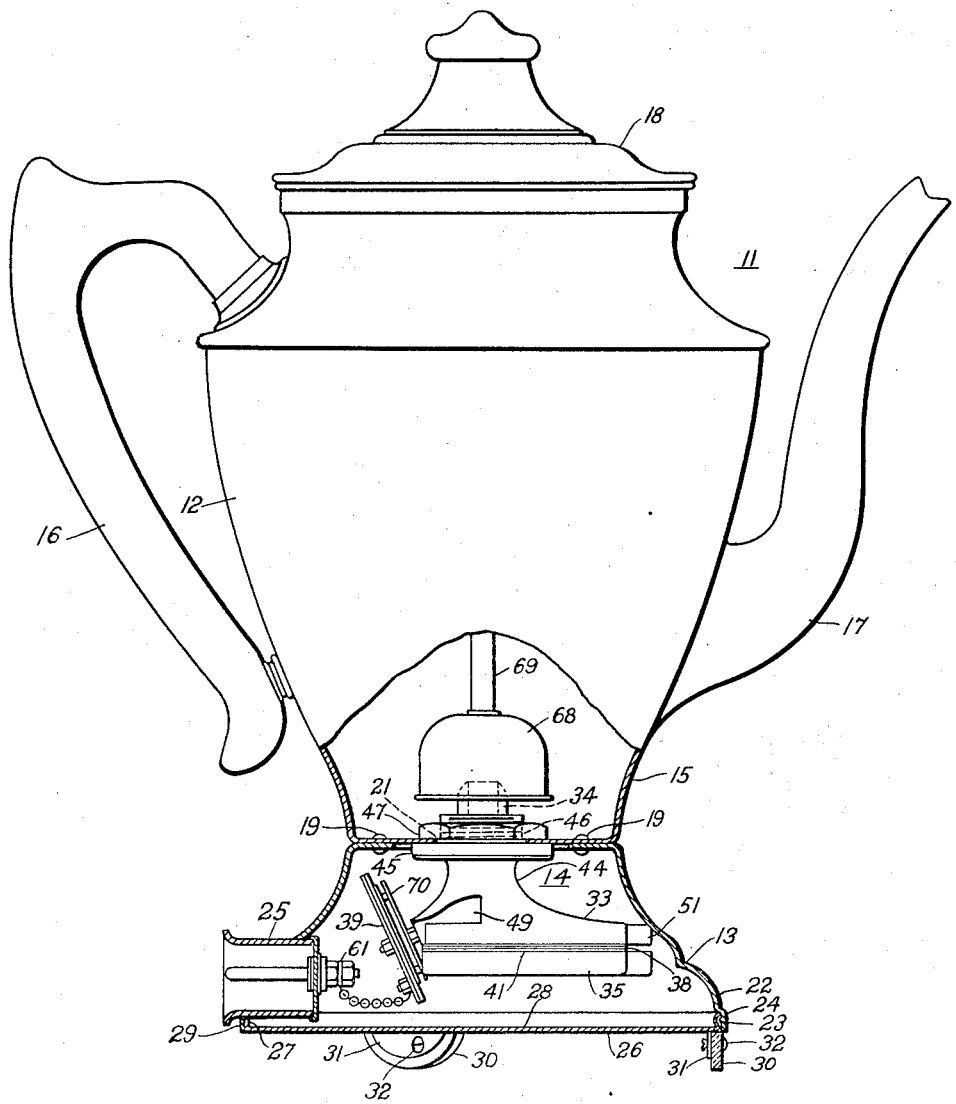
Fig. 1 is a view, partially in elevation and partially in section of an electric percolator embodying our invention.

Referring more particularly to Fig. 1, an electric percolator structure 11 comprises a fluid container 12, a supporting base 13 and a heating unit assembly 14.

The fluid container 12, made preferably of spun copper, comprises a handle member 16 attached thereto, a spout member 17 attached to the bottom portion thereof, and a cover 18. The body portion 15 is riveted to the base 13 by rivets 19. A hole 21 is common to the the container 15 and the base portion 13.

The supporting base 13 comprises an inverted portion 22 of cup-shape having lugs 23 on the circular edge 24 thereof. A terminal supporting means 25 is attached to the supporting base 13 near the rim 24 thereof.

A cover member 26 is in engagement with the base member 22 and resiliently engages the lugs 23.

The cover member 26 as illustrated in Figs. 6 and 7, is made of a circular piece of sheet-metal and has a flanged rim 27 that is disposed at substantially 90° with respect to the original flat surface 28. A plurality of semi-circular recesses are cut therein along lines 29 and the intervening portion between the lines 29 and the rim 27 is bent downwardly at an angle of substantially 180° with respect to the rim member 27 and at an angle of substantially 90° with respect to the surface 28. Leg members 30, of semi-circular shape, are attached to the depending portion 31 by rivets 32. The leg portions 30, in combination with the cover member 26, serve to enclose the heating unit 14 within the cup shape base 13 and also to provide supporting legs for the percolator body proper.

The heating unit 14 comprises a top member 33, having a vaporizing chamber 34 therein, a clamping member 35, a resistor element 38 and a thermally actuable switch 39. The member 33 may be made preferably by diecasting and the member 35 may preferably be cast iron or other similar material.

The top member 33 comprises a flat circular portion 41, and an integral laterally-extending portion 44 wherein the vaporizing chamber 34 is located. The circular portion 44 extends laterally from the flat semi-circular portion 41 and serves as a heat conducting medium for the vaporizing chamber 34. A flange 45 extends radially outward from the upper part of the portion 44 and an enlarged portion 46 extends above the flange 44 on which screw threads are located and on which a nut 47 is screwed in order to support the heating unit assembly 14 within the opening 21.

The vaporizing chamber 34 may be drilled downwardly from the top of the member 44 at 48, although it may be formed at the same time at which the member 44 is cast.

The top casting also has an annular groove 49 in the bottom of the flat portion, which encircles the bottom of the vaporizing chamber 34. Since the annular groove 49 encircles the bottom portion of the vaporizing chamber 34, a direct flow of a heat from the resistor element 38 is prevented from effecting the operation of the thermally actuable switch 39.

The bottom casting 35 is of substantially the same general shape as the bottom surface 51 of the casting 33. The lugs 52 with screw holes therein are provided in the top casting 44 and in the bottom casting 35, whereby the heating element 38 may be clamped tightly therebetween by the screw bolts 54.

The resistor element 38 is made of a material such as nichrome, in thin ribbon form, wound on a piece of mica 56 of the shape as illustrated in Fig. 4. Each side of the resistor element 38 illustrated in Fig. 4 has a mica sheet of corresponding shape attached thereto, whereby the element 38 is insulated from the members 33 and 35.

Figure 2:
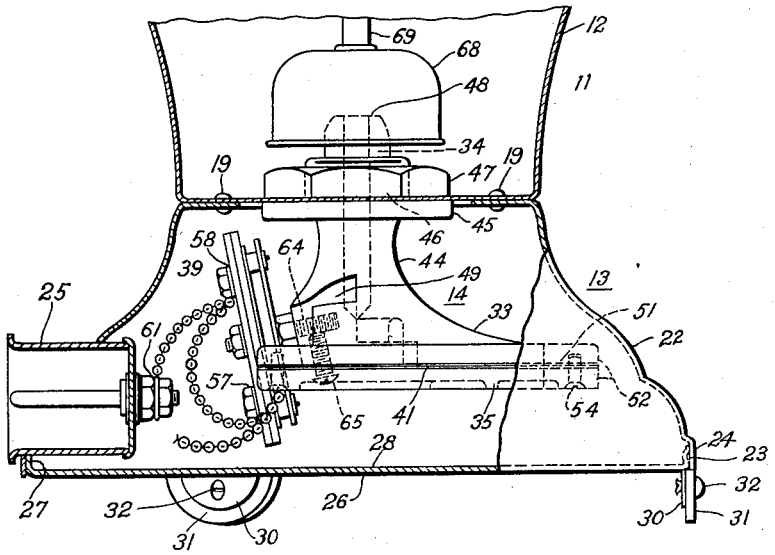
Fig. 2 is a partial view in enlarged vertical section of the device illustrated in Fig. 1.
Figure 3:
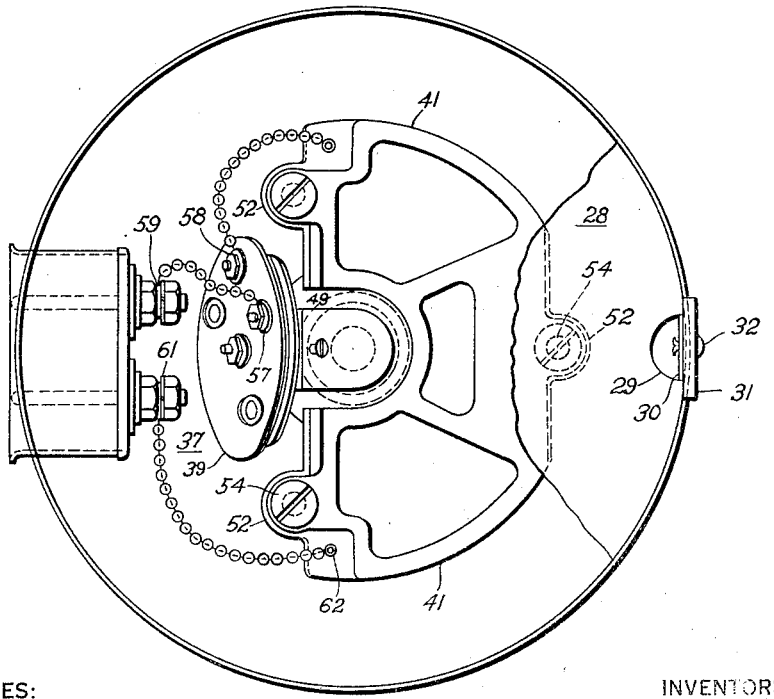
Fig. 3 is a bottom plan view of the device illustrated in Fig. 1.

The thermally actuable switch 39, illustrated in Figs. 1, 2 and 3, is attached to the casting 33 at the bottom of the vaporizing chamber portion on the side of the casting formed by the portion which is cut away along the line 42—42. The device 39, as illustrated in Figs. 1, 2 and 3, is of the type disclosed in United States Patent No. 1,448,240, to J. A. Spencer, and has contact members 57 and 58 that are in series with the resistor element 38.

The contact member 57 is attached to the terminal 59 and the other terminal 61 is attached to one terminal 62 of the resistor element 38. The terminal 63 of the resistor element 38 is attached to the contact member 58 of the device 39. The thermostat 39 is secured to the casting 33 by a stud bolt 64 which is locked in position by a screw bolt 65.

The operation of the device illustrated in the assembled view in Fig. 1 is as hereinafter described. When the container 12 is filled with a fluid, such as water, to a depth of substantially ⅔ of the height of the container 12, or to any depth which would cover the valve structure 68, illustrated in Fig. 1, the vaporizing chamber 34 becomes filled with water or the fluid. As the resistor element 38 is electrically energized by attaching the terminals 59 and 61 to a source of electromotive force, the member 33 is heated to a temperature of say 400 to 500° F. Since the fluid in the vaporizing chamber is the coolest portion of the heating unit 14, it will absorb the heat substantially as it is generated and the temperature thereof will be raised until steam is generated. The steam expands and forces the water or fluid within the vaporizing chamber 34 out through the valve 68 and the stem 69, in a manner that is well known in the art.

The percolating action just described will continue until the temperature of the body of the fluid within the container 12 has reached a value beyond which the heat energy that is transferred to the liquid from the heating unit 14 by means of the vaporizing chamber 34, will be reduced. Because of this reduction of heat energy transferred from the heating unit 14 to the vaporizing chamber 34, the temperature of members 33 and 35 will be increased.

As the temperature of the members 34 and 35 increases, the flow of heat to the thermostat 39 also increases until a bimetallic disk 70 thereof is heated sufficiently to cause it to change its shape and to open the circuit between the resistor terminal 62 and the terminal 59. When the heating unit 14 has cooled sufficiently, the disk 70 again closes the contact members of the thermostat 39 and the heating unit will again be energized.

The thermostat 39 operates in a period of time that varies inversely in accordance with the heat energy transferred from heating unit 14 to the fluid within the container 12 because, as the body of fluid within the container 12 increases in temperature, the amount of heat flow from the unit 14 decreases, whereby the unit 14 becomes hotter and hotter until the disk 70 of the thermostate 39 also increases in temperature until it operates to open the circuit of the resistor element 38.

Various modifications and changes in the device embodying our invention may be made without departing from the spirit and the scope thereof. We desire, therefore, that only such limitations shall be imposed thereon as are shown in the prior art.

We claim as our invention:

1. In an electric percolator, the combination with a fluid container having an opening in the bottom thereof, means for heating fluid located in said container comprising a member having a vaporizing chamber therein, an annular flange extending radially outward from the top portion thereof and a semi-circular flange extending radially outward from the bottom portion thereof, a resistor element associated therewith, a thermal responsive device joined thereto and means located in the bottom thereof for reducing direct heat flow from said resistor to said thermal responsive device.

2. In an electric percolator, the combination with a fluid container, means located in the bottom thereof for heating fluid in said container comprising a member, a resistor heating element clamped to the bottom thereof, a thermal responsive device attached thereto, and a groove in the bottom thereof to reduce direct flow of heat from said heating element to the thermal responsive device and for making said device operative in accordance with the rate of heat conduction from said casting to the fluid in said container.

3. In an electrically heated device, the combination with a hollow base portion having heating means therein and laterally extending lugs on the outer edge thereof, of a cover member for said base portion having the outer rim thereof bent over at an angle thereto, said rim having a groove therein extending therearound for resiliently engaging the lugs on said base portion.

4. In an electrically heated device, the combination with a base portion of inverted cup-shape having heating means therein and attached to the bottom thereof, said base portion having integral lugs extending inwardly on the rim thereof, of a cover member for said base portion having its outer edge bent over at an angle thereto, the edge portion having a groove pressed therein for resiliently engaging the lugs on said base portion, said cover member having a plurality of integral depending portions on the periphery of said cover member with leg members attached thereto.

In testimony whereof, we have hereunto subscribed our names this 12th day of December, 1925.

VICTOR G. VAUGHAN.
CLYDE C. HARPSTER.